US008568524B2

(12) United States Patent
Li et al.

(10) Patent No.: US 8,568,524 B2
(45) Date of Patent: Oct. 29, 2013

(54) METHOD FOR COATING MINERAL GRANULES TO IMPROVE BONDING TO HYDROCARBON-BASED SUBSTRATE AND COLORING OF SAME

(75) Inventors: Bowen Li, Chassell, MI (US); Ralph Hodek, Chassell, MI (US); Domenic Popko, Lake Linden, MI (US); Jiann-Yang Hwang, Chassell, MI (US)

(73) Assignee: Michigan Technology University, Houghton, MI (US)

( * ) Notice: Subject to any disclaimer, the term of this patent is extended or adjusted under 35 U.S.C. 154(b) by 293 days.

(21) Appl. No.: 13/072,267

(22) Filed: Mar. 25, 2011

(65) Prior Publication Data

US 2011/0257295 A1    Oct. 20, 2011

Related U.S. Application Data

(60) Provisional application No. 61/341,010, filed on Mar. 25, 2010.

(51) Int. Cl.
*C08L 95/00* (2006.01)
*C04B 14/06* (2006.01)

(52) U.S. Cl.
USPC .............. 106/281.1; 106/284.01; 106/284.03; 106/284.04; 106/465; 106/468; 106/469; 106/481; 106/482; 106/483; 106/486; 106/490; 106/502

(58) Field of Classification Search
USPC ............ 106/281.1, 284.01, 284.03, 436, 446, 106/453, 454, 456, 457, 464, 465, 468, 469, 106/472, 474, 475, 481, 482, 483, 486, 490, 106/502, 284.04; 427/186; 588/256
See application file for complete search history.

(56) References Cited

U.S. PATENT DOCUMENTS

| 2,118,898 | A | * | 5/1938 | Price .............................. 428/145 |
| 3,397,073 | A | * | 8/1968 | Fehner .......................... 428/405 |
| 4,378,403 | A | | 3/1983 | Kotcharian |
| 5,240,760 | A | | 8/1993 | George et al. |
| 5,380,552 | A | | 1/1995 | George et al. |
| 5,484,477 | A | | 1/1996 | George et al. |
| 6,214,466 | B1 | | 4/2001 | Joedicke |
| 6,253,495 | B1 | | 7/2001 | Weber |
| 7,060,658 | B2 | | 6/2006 | Joedicke |
| 2012/0247363 | A1 | * | 10/2012 | Lecomte et al. .................. 106/2 |

OTHER PUBLICATIONS

Witucki, Gerald L., "A Silane Primer: Chemistry and Applications of Alkoxy Silanes," The Journal of Coatings Technology, Jul. 1993 (pp. 57-60) vol. 65—No. 822.

(Continued)

*Primary Examiner* — Helene Klemanski
(74) *Attorney, Agent, or Firm* — Michael Best & Friedrich LLP

(57) ABSTRACT

Provided are compositions comprising stamp sand granules embedded in asphalt, where the stamp sand granules comprise a silane coating. Additionally provided are methods of making a silane-coated stamp sand, the methods comprising combining stamp sand granules and a silane solution to form a mixture and drying the mixture. Additionally provided are methods of covering a surface, the methods comprising combining silane-coated particles and asphalt to provide a mixture and distributing the mixture on the surface.

18 Claims, 14 Drawing Sheets

(56) References Cited

OTHER PUBLICATIONS

Articlesbase, "How to Check Your Roof for Algae and Fungus Damage," http://www.articlesbase.com/diy-articles/how-to-check-your-roof-for-algae-and-fungus-damage-760987.html, as accessed on Feb 7, 2009.

Ask the Builder, "Roof Shingles with Copper-Algae Resistant," http://www.askthebuilder.com/ NH018_Roof_Shingles_with_Copper_-_Algae_Resistant.shtml, as accessed on Jul. 18, 2011.

Cleaner Today, "Roof Armor Mold Prevention," http://www.cleanertoday.com/Roof-Shingle-Shield-Armor-Protectant-p/roof-armor.htm, as accessed on Jul. 18, 2011.

EPA, "Final Report: Minerals Recovery of Copper Mine Tailings on Lake Superior Coastline for Use as Raw Material in the Manufacture of Roofing Shingles," http://cfpub.epa.gov/ncer_abstracts/index.cfm/fuseaction/display.abstractDetail/abstract/8316/report/F, as accessed on Aug. 4, 2011.

EPA, "Final Report: Minerals Recovery of Copper Stamp Sand on Lake Superior Coastline for Use as Raw Material in the Manufacture of Roofing Shingles," http://cfpub.epa.gov/ncer_abstracts/index.cfm/fuseaction/display.abstractDetail/abstract/8754/report/F, as accessed on Aug. 4, 2011.

\* cited by examiner

A

B

C

A

B

METHOD FOR COATING MINERAL GRANULES TO IMPROVE BONDING TO HYDROCARBON-BASED SUBSTRATE AND COLORING OF SAME

CROSS-REFERENCE TO RELATED APPLICATIONS

This application claims priority under 35 U.S.C. §119(e) to U.S. Provisional Patent Application No. 61/341,010 filed on Mar. 25, 2010. The contents of this application are hereby incorporated by reference in their entirety.

STATEMENT REGARDING FEDERALLY SPONSORED RESEARCH

This invention was made with government support under Contract No. EP-D-08-062 awarded by USEPA to Lesktech Limited. The government has certain rights in the invention.

INTRODUCTION

Mineral granules used on the surfaces of roofing and siding systems are known. These natural stamp sand granules have antimicrobial activity because of their high copper content, but they cannot provide stable adhesive strength with asphalt (i.e., bitumen) substrate under a high moisture environment because of their natural hydrophilic surface characteristics.

Silane coupling agents are known as a class of organosilane compounds that have two different kinds of reactive groups bonded to silicon atoms. In the molecules of the silane coupling agent, one of the functional groups (e.g., methoxy, ethoxy, and silanolic hydroxyl groups) is reactive with various inorganic materials such as, for example, glass, mica, basalt, and rhyolite, and may form a chemical bond with the surface of the inorganic material, whereas another of the functional groups (e.g., vinyl, epoxy, methacryl and amino) is reactive with various organic materials, such as asphalt. Consequently, silane coupling agents can form a strong connection between an inorganic material, such as basalt, and an organic material, such as asphalt and bitumen.

SUMMARY

Provided, among other things, is a composition comprising stamp sand granules embedded in asphalt, where the stamp sand granules comprise a silane coating.

Additionally provided is a method of making a silane-coated stamp sand, the method comprising combining stamp sand granules and a silane solution to form a mixture; and drying the mixture.

Additionally provided is a method of covering a surface, the method comprising combining silane-coated particles and asphalt to provide a mixture and distributing the mixture on the surface.

Other aspects of the invention will become apparent by consideration of the detailed description and accompanying drawings.

DETAILED DESCRIPTION

Figure 1:
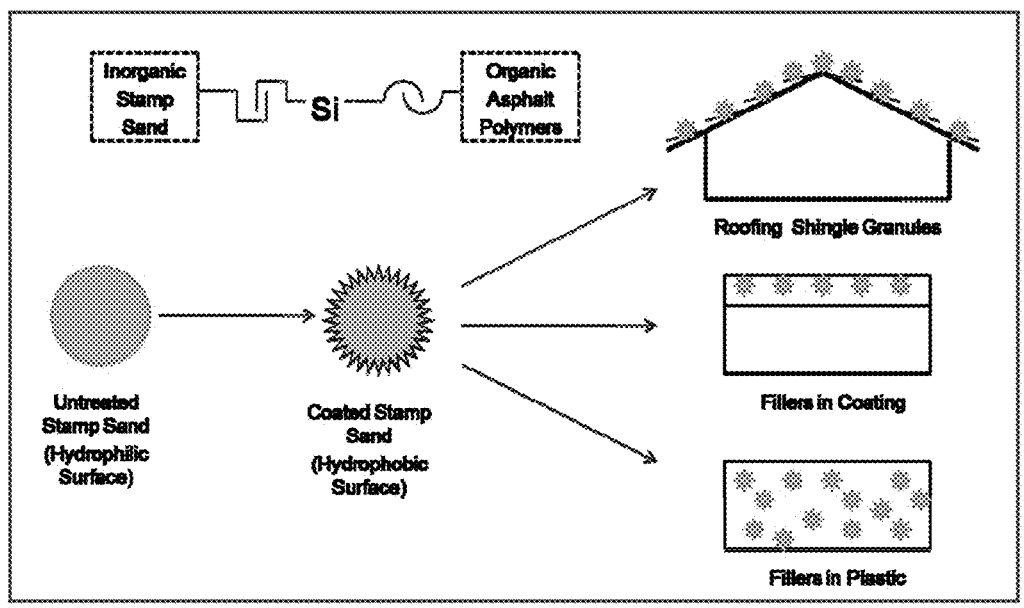
FIG. 1 shows a schematic representation of applications for silane-treated stamp sand.

Embodiments of the present disclosure may relate to microbe-resistant granules. The microbe-resistant granules may include copper tailing and may be used as granules in roofing and siding materials. Provided are methods of coating granules which may make the granules hydrophobic and bonding the hydrophobic granules to an asphaltic or bituminous substrate. Further provided are methods for producing colored granules which may have hydrophobic and adhesive properties when applied to roofing and siding shingles.

The present disclosure is not limited in its disclosure to the specific details of construction, arrangement of components, or method steps set forth herein. The compositions and methods disclosed herein are capable of being made, practiced, used, carried out and/or formed in various ways. The phraseology and terminology used herein is for the purpose of description only and should not be regarded as limiting. Ordinal indicators, such as first, second, and third, as used in the description and the claims to refer to various structures or method steps, are not meant to be construed to indicate any specific structures or steps, or any particular order or configuration to such structures or steps. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification, and no structures shown in the drawings, should be construed as indicating that any non-claimed element is essential to the practice of the invention. The use herein of the terms "including," "comprising," or "having," and variations thereof, is meant to encompass the items listed thereafter and equivalents thereof, as well as additional items. Unless specified or limited otherwise, the terms "mounted," "connected," "supported," and "coupled" and variations thereof encompass both direct and indirect mountings, connections, supports, and couplings. Further, "connected" and "coupled" are not restricted to physical or mechanical connections or couplings.

Recitation of ranges of values herein are merely intended to serve as a shorthand method of referring individually to each separate value falling within the range, unless otherwise indicated herein, and each separate value is incorporated into the specification as if it were individually recited herein. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this disclosure. Use of the word "about" to describe a particular recited amount or range of amounts is meant to indicate that values very near to the recited amount are included in that amount, such as values that could or naturally would be accounted for due to manufacturing tolerances, instrument and human error in forming measurements, and the like.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinency of any of the documents cited herein. All references cited herein are fully incorporated by reference, unless explicitly indicated otherwise. The present disclosure shall control in the event there are any disparities.

As used herein, the terms "stamp sand" and "G-sand" are used interchangeably and refer to mineral granules including copper tailing.

The terms "asphalt" and "bitumen" are used interchangeably herein and refer to a composition comprising highly condensed polycyclic aromatic hydrocarbons.

As used herein, the term "wettability" refers to the volume of water required to saturate and cover stamp sand granules with a thin film of water, wherein neither water drops from the wetted granules nor water dew among the stamp sand granules is formed.

In one aspect, the present disclosure is directed to stamp sand for use in an asphalt-based or bitumen-based roofing and/or siding system that adheres to asphalt (i.e., bitumen) and while retaining antimicrobial activity. Provided herein are new materials and corresponding processing approaches for the application of water repellent surface treatments. The methods of the present disclosure may provide a water-repellent (i.e., hydrophobic) surface on stamp sand granules by coating the granules with a silane coupling agent, which can form a chemically bonded structure resulting in greatly increasing the adhesion between stamp sand granules and asphalt-based and/or bitumen-based materials. The present disclosure also describes methods for coloring the granules during the process of applying the water-repellent surface treatment to the granules.

In some embodiments, compositions and methods of the present disclosure can be used in roofing and/or siding systems in which the granular materials, such as, for example, silica, talc, limestone, slate, basalt, and nephelite, are used to manufacture such roofing and/or siding systems. These systems include, but are not limited to, shingles, cap sheet roll roofing, modified bitumen, foam roofing, built-up roofing, metal roofing, and/or siding, and wood roofing and/or siding.

In some embodiments, compositions and methods of the present disclosure can be used in paving systems in which the granular materials, such as, for example basalt, limestone, sandstone, granite, dolomite, rhyolite, diorite, and granodiorite are used.

In some embodiments, the disclosed methods may include copper-containing aggregate material with surface enhancements of silane coating that may enhance adhesion of the aggregate material to an asphaltic backing without degrading the antimicrobial benefits of the particle. Silane coupling agents (i.e., compounds of silicon and hydrogen of the formula $Si_nH_{2n+2}$) have unique chemical and physical properties that may not only act to increase bond strength but may also prevent de-bonding at the interface during applications of composite. The improvement in surface characteristics may allow the particle to be used in a variety of applications due to the increase of the bonding capacity of the particles, as shown schematically in FIG. 1.

Another aspect provides a composition including stamp sand granules embedded in asphalt, where the stamp sand granules comprise a silane coating. In some embodiments, the stamp sand may include a silica, a kaolinite, a talc, a limestone, a slate, a basalt, a nephelite, a bentonite, or a combination thereof.

In some embodiments, the stamp sand granules may be granules of a particular size. In some embodiments, the granules may be at least at least about 4 mesh granules, at least about 6 mesh granules, at least about 7 mesh granules, at least about 8 mesh granules, at least about 10 mesh granules, at least about 12 mesh granules, at least about 14 mesh granules, at least about 16 mesh granules, at least about 18 mesh granules, at least about 20 mesh granules, at least about 25 mesh granules, at least about 30 mesh granules, or at least about 35 mesh granules.

In some embodiments, the stamp sand granules may include a mixture of mesh sizes. In some embodiments, the stamp sand may include about 5% to about 15% 8-12 mesh granules, about 33% to about 43% 12-16 mesh granules, about 25% to about 35% 16-20 mesh granules, and about 10% to about 20% 20-30 mesh granules. In some embodiments, the stamp sand granules may include about 9% 8-12 mesh granules, about 38% 12-16 mesh granules, about 30% 16-20 mesh granules, and about 15% 20-30 mesh granules.

In some embodiments, the stamp sand granules may comprise a pigment. Pigments suitable for use in embodiments of the present disclosure may include, without limitation, titanium oxide, kaolin, bentonite, red iron oxide, chrome oxide, chrome green, carbon black, metal ferrite, and mixtures thereof.

Asphalts suitable for use in embodiments of the present disclosure include those know to one skilled in the relevant art, In some embodiments, the asphalt may include a modified asphalt, such as, for example, an asphalt including a polymer. In some embodiments, the polymer may include a rubber, such as, for example, a styrene-butadiene rubber.

In some embodiments, the silane coating may include, for example, methyltrimethoxysilane, ethyltrimethoxysilane, methacryloxypropyltrimethoxysilane, mercaptopropylmethyldimethoxysilane, and mixtures thereof.

In some embodiments, the composition including stamp sand granules embedded in asphalt may include additional materials, such as, for example, paper, fiberglass, bitumen, synthetic resins, or a combination thereof.

Adhesion of stamp sand granules to an organic substrate (e.g., asphalt) can be determined by soaking the stamp sand granule/organic substrate composition in water for a length of time, then separating random granules from the substrate. Each of these granules may be evaluated as to whether its previously-embedded area retains asphalt (i.e., the adhesive area) or if asphalt is now absent from the previously-embedded area. The adhesion of an individual stamp sand granule or the average adhesion of a plurality of stamp sand granules can be calculated using Equation 1.

$$\text{Adhesion}(\%) = \frac{\text{Area asphalt retained}}{\text{Total Area asphalt embedded}} \times 100 \qquad (1)$$

In some embodiments, the length of time that the stamp sand granule/organic substrate composition may be soaked in water may be about 1 day, about 2 days, about 3 days, about 4 days, about 5 days, about 6 days, about 7 days, about 8 days, about 9 days, about 10 days, about 12 days, or about 15 days. In some embodiments, the length of time that the stamp sand granule/organic substrate composition may be soaked in water may be about 1 to about 15 days, about 2 days to about 12 days, or about 3 days to about 10 days. In some embodiments, the average adhesion may be at least about 50%, at least about 55%, at least about 60%, at least about 65%, at least about 70%, at least about 75%, at least about 80%, at least about 85%, at least about 90%, at least about 91%, at least about 92%, at least about 93%, at least about 94%, at least about 95%, or at least about 96%. In some embodiments, the average adhesion may be at least about 60% after the composition has soaked in water for about 3 days to about 10 days.

The efficacy of the treatment to provide hydrophobicity may also be checked by comparing the height of capillary rise of water into the treated stamp sand to the height of capillary rise into untreated stamp sand. A determination using treated and untreated stamp sand with particle sizes between 0.075 mm and 0.150 mm showed that water would rise 56 cm above the static water source in the untreated stamp sand, but would not rise at all above the static water source in the treated stamp sand.

In another aspect, a method of making a silane-coated stamp sand is provided. The method may include combining stamp sand granules and a silane solution to form a mixture, followed by drying of the mixture.

In some embodiments, the stamp sand granules may be dry granules, in other embodiments, the stamp sand granules may include some amount of water, (i.e., the stamp sand granules may not be dry).

In some embodiments, the silane solution may have a concentration of at least about 0.01%, at least about 0.05%, at least about 0.1%, at least about 0.2%, at least about 0.3%, at least about 0.4%, at least about 0.5%, at least about 1%, or at least about 2%. In other embodiments, the silane solution may have a concentration of no more than about 20%, no more than about 18%, no more than about 16%, no more than about 15%, no more than about 14%, no more than about 13%, no more than about 12%, no more than about 11%, or no more than about 10%. In some embodiments, the silane solution may have a concentration of about 0.01% to about 20%, about 0.05% to about 18%, about 0.1% to about 16%, about 0.2% to about 15%, about 0.3% to about 14%, about 0.4% to about 13%, about 0.5% to about 12%, about 1% to about 11%, or about 2% to about 10%. In some embodiments, the silane solution may comprise at least about 0.1 wt. % of the silane solution/stamp sand granule mixture, at least about 2.0 wt. % of the silane solution/stamp sand granule mixture, or at least about 10.0 wt. % of the/silane solution/stamp sand granule mixture.

Mixing may be accomplished by methods known to those skilled in the relevant art, and may include manual mixing, machine mixing, or a combination thereof. Devices suitable for combining the stamp sand granules and the silane solution can include, for example, a rotary drum mixer, a blender, an emptied ball mill, or a rotary kiln.

In some embodiments, the stamp sand granules may comprise a ceramic coating. The ceramic coating may include, for example, sodium silicate, a metal oxide, clays, and other microsized/submicrosized rock powders. In some embodiments, the metal oxide may include, for example, titanium oxide, red iron oxide, aluminum oxide, silica, manganese oxide, cobalt oxide, copper oxide, chrome oxide, metal ferrite, and mixtures thereof.

In some embodiments, the mixture may be air dried. In some embodiments, the mixture may be dried in, for example, an oven or furnace. In some embodiments, the mixture may be dried at a temperature of from about 40° C. to about 110° C.

Another aspect provides a method of covering a surface, including the steps of combining silane-coated particles and asphalt to provide a mixture and distributing the mixture on the surface. In some embodiments, the surface may be, for example, a road, a sidewalk, a path, or a runway.

EXAMPLES

Methods

Silane-Treated Stamp Sand Granules on Asphalt-Based Substrates

The following methods provide processes of making and evaluating silane-treated stamp sand granules for roofing and/or siding systems.

Determination of Wettability of Water on Stamp Sand Granules

Stamp sand granules (300 g) with a specific particle size distribution are placed into a box furnace pre-heated at 110° C. The stamp sand granules are heated for 2 hours. After cooling, the stamp sand granules (200 g) are placed in a plastic beaker (600 mL), to which distilled water is slowly added, while vigorously stirring the stamp sand with a glass rod, until the all of the surfaces of the granules are homogenously saturated and covered with a thin film of water but neither water drop from the wetted granules, or water dew among the particles is formed. This volume of water required to saturate the granule surface is the "wettability" of water to stamp sand granules.

Generally, the determined wettability of water to stamp sand granules was 4-6% of water to granules on a dry weight basis. This quantity determines the least amount of liquid treatment that needs to be added to the dry granules to insure complete surface coverage of the granules.

Surface Modification of Stamp Sand Granules by Coating with Alkoxy Silane

The treatment of stamp sand granules with the silane coupling agent was carried out by a "semi-drying" method. That is, the amount of silane solution mixed with stamp sand granules was the amount required to completely saturate the surface of the mass of stamp sand granules. During and after blending, the stamp sand granules were well-saturated with silane solution, but there was no liquid that could be drained out from the mixed sand.

Preparation of Silane Solution

Distilled water (50 mL) is poured into a glass flask (200 mL). The selected silane coupling agent (0.1-20 mL) is added to the flask, and the volume of solution is brought to 100 ml with distilled water. The pH of the water is adjusted to about 3-6 with glacial acetic acid or hydrochloric acid. The covered solution is stirred with a TEFLON®-coated magnetic stirrer (0.5") for 5-40 minutes to allow the silane to become homogenously dissolved in water.

The type of silane coupling agent is selected according to the substrate materials into which stamp sand granules will be embedded. For example, if the substrate material is asphalt, the preferred silane coupling agent may be methyltrimethoxysilane ($CH_3Si(OCH_3)_3$), which is available in commercial products, such as KBM-13 (Shin-Etsu Chemical Co., Ltd., Tokyo, Japan) and Z6070 (Dow Corning Co., Midland, Mich.).

Treatment of Stamp Sand Granules with Silane Solution

Weigh a desired amount of dried stamp sand granules, put the dried stamp sand granules in a plastic beaker (600 mL), and add 2-10 ml silane solution for each 100 grams of stamp sand granules while vigorously blending the granules with a glass rod. The granules are continuously blended for 5 minutes to uniformly distribute the silane. Spread the treated stamp sand granules in a metal pan, and let the treated granules air-dry naturally or in a ventilated hood, or by heat-drying at 50-110° C. in a furnace. Heat-drying is preferred to reduce the surface moisture of the granules and improve the adhesion of the granules to asphalt substrate.

Alternatively, the blending can be carried out with a mixing machine, such as a rotary mixer, blender, emptied ball mill, or a rotary kiln. The mixing of silane solution with stamp sand granules can be performed by pouring the solution into the mass of granules or by spraying the solution into the mass of granules. Prior to the blending process, the temperature of the granules can be cold as room temperature or the granules may be warmed by preheating them up to 110° C.

The content of silane in the solution is controllable and is based on the adhesive power required between the asphalt and the granules. Reducing silane content in the solution results in a thinner film and partial coating of silane on the granule surface, which creates a partly hydrophilic and partly hydrophobic surface on the granules. In general, if the silane content in the solution is greater than 3% in a ratio of volume of silane compound versus stamp sand granules or 0.15% in a ratio of silane compound versus stamp sand granules in weight, the granule surface will be entirely covered by a silane triol network. Further addition of silane increases the thickness of the coating on the granule surface. However, a partly-coated surface not only reduces the cost of silane coating, but also maintains a path for the release of copper from the original granules to the nearby environment.

Any sized particles of stamp sand can be treated with the silane coupling agent to form a hydrophobic surface which will produce chemical bonding to an organic substrate. However, with higher specific surface areas, fine particles may need more silane per unit weight to cover the surface than do the coarse particles. The specific amount of silane required can be experimentally determined.

During the drying process, the vapor from the moisture of the treated granules may be collected by condensing methods to produce methanol products, which are routine industrial procedures.

Rapid Determination of Hydrophobicity of Stamp Sand Granules

Referring to a common "volcano test" used in the roofing shingle industry, the volcano test is carried out as follows: fill a round-bottom glass test tube with 8-10 ml stamp sand granules, invert the tube on a glass plate, and let the granules naturally pile up as a cone on the plate. Make three, small circular depressions on the top of the pile of sand, then place one droplet of water into each of the depressions. Measure the amount of time for the water droplets to be absorbed into the "volcano". The average time to absorb the water is the water repellency of the granule material.

The efficacy of the treatment to provide hydrophobicity may also be checked by comparing the height of capillary rise of water into the treated stamp sand to the height of capillary rise into untreated stamp sand. A determination using treated and untreated stamp sand with particle sizes between 0.075 mm and 0.150 mm showed that water would rise 56 cm above the static water source in the untreated stamp sand, but would not rise at all above the static water source in the treated stamp sand.

Embedding Silane-Treated Stamp Sand Granules in Asphalt-Based and/or Bitumen-Based Materials Spread silane-treated stamp sand granules on a glass slide which has been coated with a thin layer of organic substrate, such as asphalt and bitumen, or utilize a common commercial method. Heat the slide with treated granules to 200-450° C. with a hot plate to melt the organic substrate. Let the granules become embedded in the substrate, then cool to room temperature. This process can be carried out in various furnaces.

Test of Adhesion Between Stamp Sand and Organic Substrate Materials

Embedded slides are soaked in distilled water for 3-10 days. Adhesion of granules to the organic substrate (e.g., asphalt) is determined by removing each slide from the soak tank, gently rinsing it with distilled water, and placing the slide on the stage of a binocular microscope. Thirty to fifty granules are randomly removed with a tweezer from the slide's asphaltic covered surface. Each of these granules is evaluated as to whether its previously embedded area still retained asphalt or if some of the previously coated area was now absent of any asphalt, which would indicate a loss of bonding between the granule and the asphalt. The cumulative area of the granules affected by soaking is estimated and the adhesion is computed as shown in Equation 1.

$$\text{Adhesion}(\%) = \frac{\text{Area asphalt retained}}{\text{Total Area asphalt embedded}} \times 100 \quad (1)$$

Surfacing Untreated Stamp Sand Granules on Organic Substrates

The following methods provide processes for embedding non-silane-treated stamp sand granules on the surfaces of organic substrates, including, but not limited to, asphalt, bitumen, and synthetic resins.

Preparation of Silane Solution

Distilled water (50 mL) is poured into a glass flask (200 mL). The selected silane coupling agent (0.2-20 mL) is added to the flask, and the volume of solution is brought to 100 ml with distilled water. The pH of the water is adjusted to about 3-6 with glacial acetic acid or hydrochloric acid. The covered solution is stirred with a TEFLON®-coated magnetic stirrer (0.5") for 5-40 minutes to allow the silane to become homogenously dissolved in water. The amount of silane depends on the sand's mineralogy, surface texture, and particle size. It is determined experimentally for best results, where best is defined in terms of the most economically-acceptable physical improvement.

The type of silane coupling agent is selected according to the substrate materials into which stamp sand granules will be embedded. For example, if the substrate material is asphalt, the preferred silane coupling agent may be, for example, methyltrimethoxysilane ($CH_3Si(OCH_3)_3$), which is available in commercial products, such as KBM-13 (Shin-Etsu Chemical Co., Ltd., Tokyo, Japan) and Z6070 (Dow Corning Co., Midland, Mich.).

Surfacing Untreated Stamp Sand Granules on Organic Substrate

On the surface of a base plate such as, for example, felt, bitumen treated paper, glass, wood, metal, or a surface with organic coats (e.g. asphalt and bitumen, refer to common commercial method) for roofing and/or siding system, make an even thin film of silane solution by swabbing or spraying. The amount of silane solution required for making 1 square meter of the thin film is typically 0.1-5 mL. Spread the dried stamp sand granules without silane on the surface covered with silane solution to form a single layer of granules based on a desired granule density. Place the base plate with stamp sand granules and organic substrate on a hot plate or in a furnace and slowly heat the materials until the granules are embedded into the organic substrate followed by cooling the plate.

While not wishing to be bound by a particular theory, the initial embedding of the mineral granules onto the organic substrate may occur at room temperature, by allowing the silane coupling agent to adjust the orientation of its functional groups toward the granules and the asphalt, respectively. During heating, the water and methane in the silane solution are evaporated, while the silane triol (e.g., $CH_3Si(OH)_3$) forms an intercross chemical bond between the granules and asphalt. This process provides chemical bonds between stamp sand granules and an organic substrate embedding the granules. In addition to providing improved chemical bonding, this method also makes that portion of each granule which was in contact with the silane solution hydrophobic. Consequently, the upper side of the surface of the granules maintains its original properties and hydrophilic feature, whereas the lower side is embedded into the asphalt substrate.

Combined Coloring and Silane Treatment of Stamp Sand Granules

The methods below provide processes for preparing colored stamp sand granules and a process for embedding the colored granules on an organic substrate for roofing and/or siding system.

Different colors of ceramic-coated stamp sand granules can be obtained by coating various pigments onto the granules. Pigments suitable for use in embodiments of the present disclosure may include, without limitation, titanium oxide, kaolin, bentonite, red iron oxide, chrome oxide, chrome green, carbon black, metal ferrite, and mixtures thereof.

Preparation of Silane Solution

Distilled water (50 mL) is poured into a glass flask (200 mL). The selected silane coupling agent (0.2-20 mL) is added to the flask, and the volume of solution is brought to 100 ml with distilled water. The pH of the water is adjusted to about 3-6 with glacial acetic acid or hydrochloric acid. The covered solution is stirred with a TEFLON®-coated magnetic stirrer (0.5") for 5-40 minutes to allow the silane to become homogenously dissolved in water.

Preparation of Colored Stamp Sand Granules

Weigh a desired amount of dried stamp sand granules, put the dried stamp sand granules in a plastic beaker (600 mL), and add 2-10 ml silane solution for each 100 grams of stamp sand granules while vigorously blending the granules with a glass rod. Blend the granules continuously for about 3 minutes to uniformly distribute the silane solution. Then add 0.5-10 wt % of fine powder of pigments with a spray gun while continuously stirring the granules until the pigments are uniformly distributed on the surface of the stamp sand granules. The treated granules are then dried naturally in air, or in a ventilated hood, or by heat-drying at 40-110° C. in a furnace.

Method of Preparing Colored Roofing Granules

A method of preparing colored roofing granules is as follows:
(1) Screen the stamp sand to the desired size suitable for roofing manufacturing.
(2) Prepare a pigment slurry by mixing the following components (in weight percentage of based on stamp sand granules to be coated):
Water 10-15 wt. %
Sodium silicate solution 15-30 wt. % (38% solids, $SiO_2/Na_2O$=2.9)
Pigments 0-8 wt. %
Kaolin clay 10-18 wt. %
These components are combined into a slurry by using a suitable mixing device.
(3) Mix the slurry with the granules in a suitable apparatus to produce the individually color-coated granules.
(4) Pre-dry the color-coated granules at 110° C. in a furnace to reduce their moisture content to about 0.2 to 0.5%.
(5) Fire the color-coated granules at a temperature of from about 500° C.-600° C. to form an insoluble ceramic coating.
(6) Treat the color-coated granules with silane solution to improve asphalt adhesion.
(7) Apply the finished granules to the asphalt/bitumen coated roof shingles using conventional techniques.

Example 1

A stamp sand sample with a particle size among 8-40 meshes was put into a box furnace pre-heated at 110° C. and was heated for 2 hours. After cooling down, 200.0 g dried stamp sand sample was placed into a 600 mL plastic container, and 6 mL distilled water was added while vigorously blending the sand sample with a glass rod. Then, more water was added while stirring the sample until the entire surface of all the granules was homogeneously wetted. The additional amount of water added was 8 mL, or 4% in the ratio of water vs. stamp sand.

Silane Solution Preparation

Silane solution was prepared by adding 50 mL distilled water into a 200 mL glass flask, transferring 5 mL methyltrimethoxysilane (KBM-13, available from Shin-Etsu Chemical Co., Ltd., Tokyo, Japan) into the flask, and bringing the volume of solution to 100 mL with distilled water. A 0.5" TEFLON®-coated magnetic stirrer magnetic was then placed into the flask, and the flask was covered with a watch glass. The solution was stirred for 30 minutes to allow the silane to homogenously dissolve in water. The pH value was adjusted to 4.5 with glacial acetic acid.

200.0 g dried stamp sand granules were placed in a 600 mL plastic beaker (HDPV), and 10.0 ml of the prepared silane solution was added while vigorously blending the stamp sand granules with a glass rod. The sample was continuously blended for 5 minutes to uniformly distributed the silane solution. The treated granules were spread in a stainless steel pan, and the sample was air-dried naturally in a ventilated hood. The resulting product was silane-treated stamp sand granules.

Volcano Test

A round-bottom glass test tube was filled with 8 mL of silane-treated stamp sand granules. The tube was inverted on a glass plate and the granules were allowed to naturally pile up as a cone on the plate. A small circular depression was made on the top of the pile of sand, into which one droplet of water was placed, and the amount of time for the water droplet to be absorbed into the "volcano" was measured.

The water droplet remained on the top of the finished stamp sand granules for about 3.5 hours until it was evaporated under dry laboratory air conditions, and 241 hours in a humid environment (i.e, a covered glass container, maintaining relative humidity greater than 95%). In contrast, in the same "volcano" test using untreated stamp sand granules, the untreated stamp sand granules were saturated with water immediately as the water droplet immediately disappeared into the depression.

Adhesion Test

Example 1

On a glass mat surfacing asphalt coat ("Oxidized Asphalt" is a commercial product for shingle coating of Owens Corning Roofing and Asphalt, LLC, Toledo, Ohio), silane-treated and untreated stamp sand granules were separately embedded on the surface of asphalt substrate by heating the substrate on a hotplate and allowing the granules to sink in and embed themselves to approximately 50% by surface area into the melted asphalt and then soaked in water for 3 weeks. The adhesion strength was determined by removing embedded granules from asphalt substrate with aid of a tweezer and microscope, and counting the area of asphalt retained on each granule versus the area originally embedded in asphalt.

Experimental results showed that the silane-treated granules tightly adhered to asphalt with 97% of retained surface, while the untreated granules could be easily removed without any asphalt clinging to them.

Example 2

200 grams of dried stamp sand granules with a particle size among 8-40 meshes were placed into a 600 mL plastic beaker, and 10 mL of 2.0% silane solution prepared as described in Example 1 were added. The mixture was stirred with a glass rod for 5 minutes before being dried at 100° C. in furnace for 2 hours.

The water repellency of the silane-treated granules by the "volcano test" was 8 hours when it was measured in a covered glass container, maintaining relative humidity greater than 95%.

Example 3

200 grams of dried stamp sand granules with a particle size among 8-40 meshes was pre-heated at 110° C. in a box furnace for 2 hours. The granules were then taken in a 600 ml plastic beaker, and 10 ml of 2.5% silane solution pre-prepared followed the description in the Example 1 was added. The mixture was stirred in a plastic blender for 5 minutes before being air-dried.

The water repellency of the silane-treated granules by the "volcano test" was 2.7 hours when it was dried in the normal laboratory air. In this example the asphalt retained area was 95% using the procedure described in Example 1.

Example 4

1150 mL tap water was poured into a stainless steel laboratory blender having a 2-qt. mixing capacity, and a motor-driven timer. While stirring the water at a speed of 100 RPM, 45 mL methyltrimethoxysilane (KBM-13) was added. The water was continually stirred for 15 minutes to let the silane homogenously dissolve in water. The pH value of the water solution was adjusted to 4-4.5 with glacial acetic acid. The water solution was continually stirred for 3 minutes.

In a portable concrete mixer with a 10 gallon drum size, 25 kg of dried stamp sand granules with a particle size among 12-16 meshes were rotated at 60 RPM, and the silane solution was uniformly sprayed on the top stamp sand granules with a spray atomizer during the rotating. The mixer with stamp sand granules was rotated for 5 minutes. The granules were dumped out on a bench for air-drying, then put into an air-forced electric dryer preheated at 100° C. for 2 hours.

The water repellency of the silane-treated granules by the "volcano test" was 2.8 hours when it was dried in the normal laboratory air. The water repellency of the silane-treated granules by the "volcano test" was over 14 days when it was evaporated in humid conditions. In this example the asphalt retained area was 67.7% using the procedure described in Example 1.

Example 5

4400 mL tap water was poured in a stainless steel laboratory blender, which has a 5-qt. mixing capacity, and a motor-driven timer. While stirred the water at a speed of 100 RPM, 120 mL methyltrimethoxysilane (KBM-13) was added, as described in Example 1. The water was continually stirred for 15 minutes to allow the silane to homogenously dissolve in water. The pH value of the water solution was adjusted to 4-4.5 with glacial acetic acid. The water solution was continually stirred for 3 minutes.

In a concrete mixer with a 50 gallons drum size, was added 100 kg of dried stamp sand granules with a particle size among 8-40 meshes. The granules were then rotated at 60 RPM, and the silane solution was uniformly sprayed on the top stamp sand granules with a spray atomizer. The mixer with stamp sand granules was rotated for 5 minutes. The granules were dumped out on a bench for air-drying, then put into a air-forced electric dryer preheated at 100° C. for 2 hours.

The water repellency of the silane-treated granules by the "volcano test" was 2.8 hours when it was dried in the normal laboratory air.

Example 6

A 2% silane solution was prepared as described in Example 1. The pH value of the silane solution was adjusted to 3.5 with glacial acetic acid.

A thin steel sheet (2.0 feet by 2.0 feet) was covered with an asphalt layer and then covered with a uniform thin film of silane solution by applying 2.0 ml of the silane solution with a spray gun. Dried stamp sand granules were spread on the surface covered with the wet silane solution to form a single layer of granules based on a desired granule density. The sheet with stamp sand granules and asphalt substrate was cut into 4 pieces and placed on an infrared hotplate and slowly heated to 150° C. until the granules were embedded in the asphalt substrate. Then the plate was cooled down. This process provided a strong chemical bond between the stamp sand granules and asphalt substrate embedding the granules, as determined by the adhesion test described in Example 1.

Example 7

The following coating composition in grams was applied to 1000 grams of dried stamp sand granules.

| | |
|---|---|
| Water | 15.0 g |
| Sodium Silicate (38% solids, $SiO_2/Na_2O$ = 2.9) | 26.0 g |
| Titanium Dioxide | 3.5 g |
| Bentonite Clay | 16.0 g |
| Total: | 60.5 g |

The mixture of coating composition was placed in a 500 mL glass beaker and vigorously stirred for 1 minute. Then the coating slurry was transferred with the granules into a 2-quarts sealed container, and placed on a rolling mixer for re-mixing for 3 minutes. The coated granules were transferred to a metal tray and heated at 110° C. in a furnace to remove the moisture from the coated granules. The color-coated granules were fired at a temperature of about 600° C. to produce an insoluble ceramic coating.

The color-coated granules were treated with silane solution to improve asphalt adhesion as described in the Example 1.

This example was repeated several times with the titanium dioxide being replaced with bentonite, red iron oxide, black carbon, and chrome green to produce different colors, while the water, sodium silicate binder, and kaolin loadings were kept constant.

Example 8

Hydrophobic Modification of Stamp Sand Granules

Materials
Stamp Sand Granules

The G-sand granules used were a mixture of various sizes of G-sand grains. The G-sand granules were prepared by screening the raw stamp sand acquired from Gay, Mich., and remixing the grains to meet the requirement of the grain size distribution. The particle size distribution of stamp sand granules used is shown in Table 1.

TABLE 1

Range of particle sizes in G-sand mixture

| Range of Particle Size (mesh) | wt % |
|---|---|
| 8~12 | 9 |
| 12~16 | 38 |
| 16~20 | 30 |
| 20~30 | 15 |
| 30~40 | 8 |
| Sum | 100 |

Figure 2:
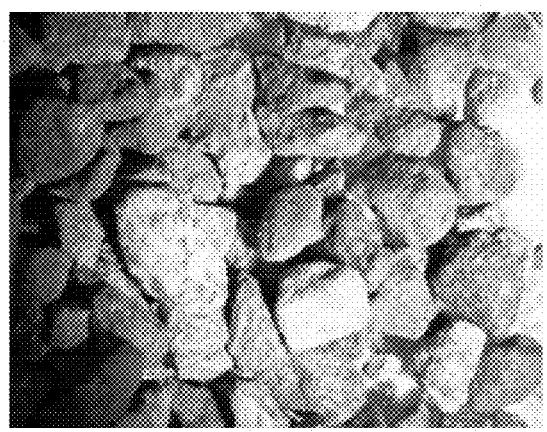
FIG. 2 shows a stamp sand mixture as viewed under a binocular microscope.

FIG. 2 shows a sample of the stamp sand after being blended to the proportions listed in Table 1.

Silane Agent

The silane compounds used included methyltrimethoxysilane ($CH_3Si(OCH_3)_3$), which is available in commercial products, such as KBM-13 (Shin-Etsu Chemical Co., Ltd., Tokyo, Japan) and Z6070 (Dow Corning Co., Midland, Mich.). The physical properties of the silane are:
Molecular mass: 136.25 g/mol
Flash point: 8° C.
Boiling point: 102° C.
Vapor density (air=1): 4.7
Specific gravity: 0.95 (25° C.)
Asphalt The asphalt used is a commercial product for shingle coating of Owens Corning Roofing and Asphalt, LLC., "Oxidized Asphalt" (provided by Trumbull-ATL, Summit, Ill.). The physical properties of the asphalt are:
Softening Point: 104° C. (219° F.)
Viscosity: 330 cP at 400° F.
Flash point: >274° C. (525° F.) (Open Cup)
Auto Ignition Temperature: >343° C. (650° F.)
Boiling point: >538° C. (1000° F.)
Surface Treatments of Stamp Sand
Determination of Wettability of Water on G-Sand G-sand mixture (200 g; Table 1) was placed in a 600 mL plastic beaker. Distilled water was added with vigorous stirring with a glass rod for 2 minutes; the volume of water required to homogenously saturate the granule surfaces without causing water dew, bead, or to flow form among the particles, is the wettability of water to G-sand.

The determined wettability of water to G-sand was 4% in the ratio of water vs. G-sand.
Surface Modification of Stamp Sand Granules by Silane Treatment The treatment of stamp sand with silane solution was carried out by the "semi-drying" method. That is, the amount of silane solution mixing with stamp sand is the required amount to disperse and saturate the surface of G-sand granules. During and after blending, the sample body is "semi-dried". All the granules were well-saturated with silane solution, but there was no liquid that could be drained out from the mixed sand.
Preparation of Silane Solutions Silane solution was prepared as described in Example 1. The pH of the solution was adjusted to about 4-5. Silane solutions with alternative silane concentrations and various amount of silane solution were also used to determine the relationship between hydrophobicity of silane-treated stamp sand granules and the amount of silane used, in order to optimize the treatment process, and lower the product cost by reducing the consumption of silane.

Treatment of Stamp Sand Granules with Silane Solution

A desired amount of dried stamp sand granules was weighed, put in a plastic beaker (600 mL), and add 2-10 ml of silane solution was added for each 100 grams of stamp sand granules while vigorously blending the granules with a glass rod. The granules were blended continuously for about 5 minutes to uniformly distribute the silane solution. The treated granules were spread in a stainless steel pan and allowed to air-dry in ventilated hood or heat-dry at 105° C. in a box furnace.

Characterization and Tests

Hydrophobicity

Two methods were individually used to evaluate the hydrophobicity of untreated and treated G-sand samples:

1) Rapid Determination of Hydrophobicity of G-Sand:
A glass slide was placed under a binocular microscope, 20-30 G-sand granules were placed on the slide, and 2-3 droplets of distilled water were deposited next to the granules. The water bead was moved slowly toward the granules with a stainless steel needle. Once the water contacted the granules, the wettability of water to G-sand granules was observed and the fraction of the surface area of the granules that resisted water.

2) Volcano Test of Treated G-Sand:
The volcano test was performed as described in Example 1. The volcano test on each sample was performed in triplicate.

Adhesion Test

Figure 3:
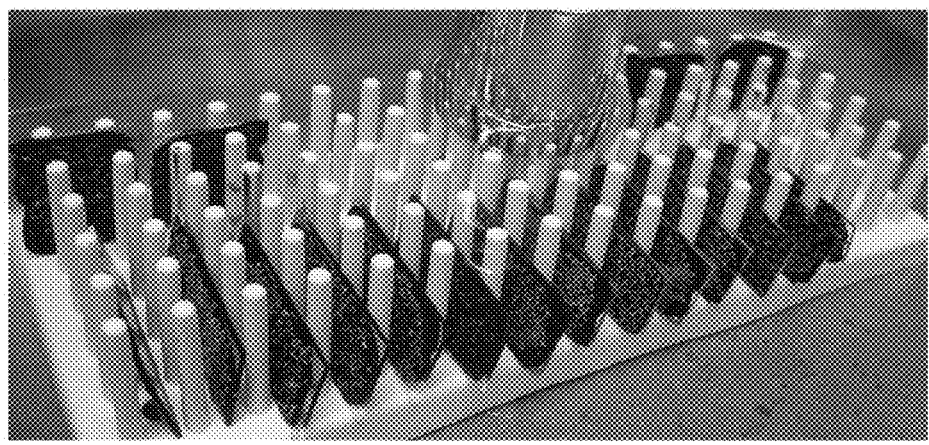
FIG. 3 shows a photograph of asphalt slides with embedded G-sand granules soaking in water.
Figure 4:
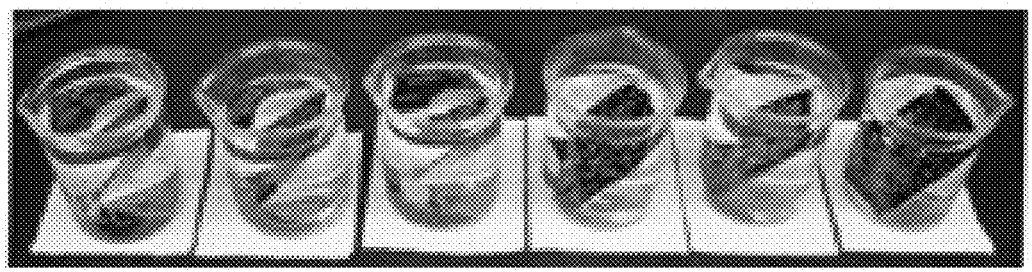
FIG. 4 shows asphalt slides with embedded G-sand granules soaking in water.

All prepared samples of G-sand were spread and embedded on asphalt slides by melting the asphalt slide on an infrared hotplate until the granules naturally sank in the asphalt for the adhesion test. Embedded slides were soaked in distilled water for 10 days as shown in FIG. 3 and FIG. 4. Adhesion of granules to asphalt was determined by plucking granules from asphalt substrates under a binocular microscope, and counting the area retained (plucked out) the binding asphalt versus the area embedded in asphalt. That is, 30 granules were randomly plucked out from asphalt substrate on each slide, and the average adhesive areas were calculated using Formula 1.

Weathering Test

Figure 5:
FIG. 5 shows a QUV Accelerated Weathering Tester used in experiments of the present disclosure.

To investigate the surface stability of silane-treated stamp sand granules under sunlight radiation and weather change, a QUV Accelerated Weathering Tester (Q-Panel Lab Products, Cleveland, Ohio) was used (FIG. 5). This instrument was designed based on ASTM G147-09 weathering test standard. The QUV Accelerated Weathering Tester has options for selection of the UV wavelength and intensity of UV-A or UV-B, to change test temperature between 40-80° C., to set hours for a cycle of daytime and nighttime, while keeping the relative humidity at 100%.

The test samples came from three silane-treated stamp sand batches prepared according to different procedures:

GSC-38, silane-treatment associated with white color pigment was prepared as follows. The following coating composition in grams was applied to 1,000 grams of dried stamp sand granules:

Water 20.0
Sodium Silicate 40.0 (50% 1.6° sodium silicate)
Titanium Dioxide 20.0
Bentonite Clay 120.0
Total: 200.0 grams Sodium silicate was combined with water and stirred for 3 minutes to prepare sodium silicate solution. Pigment powder was prepared by mixing bentonite with titanium dioxide and vigorously blending. Stamp sand granules were placed into a stainless steel container, and the sodium silicate solution was poured onto the granules, which were vigorously stirred for about 2 minutes to let the sodium silicate solution fully saturate the granules. The pigment powder was added to the wetted granules, and the mixture was blended for 5 minutes to uniformly cover the wetted granules with pigment powder. The pigment-coated granules were dried in a furnace at 110° C. for 2 hours, then fired it at 600° C. for 2 hours. After cooling down to room temperature, 50 mL of a 4% KBM-13 solution was added to the ceramic-coated granules, which were stirred for 5 minutes. The silane-treated ceramic-coated granules were dried at 105° C. in a furnace to remove the moisture from the coated granules.

GSC-51, silane-treated with lower silane content was prepared as follows. A stamp sand sample with a particle size among 8-40 meshes was put into a box furnace pre-heated at 110° C. and was heated for 2 hours. After cooling down, 200.0 g dried stamp sand was placed into a 600 mL plastic container, and 10 mL 2% silane solution was added while vigorously blending the sand sample with a glass rod until the entire surface of all the granules was homogeneously wetted. The silane-treated sample was dried in a furnace at 110° C. for 2 hours.

GSC-55, silane-treated with high silane content was prepared as follows. A stamp sand sample with a particle size among 8-40 meshes was put into a box furnace pre-heated at 110° C. and was heated for 2 hours. After cooling down, 200.0 g dried stamp sand was placed into a 600 mL plastic container, and 10 mL 6% silane solution was added while vigorously blending the sand sample with a glass rod until the entire surface of all the granules was homogeneously wetted. The silane-treated sample was dried in a furnace at 110° C. for 2 hours.

Figure 6:
FIG. 6 shows sample panels for weathering test.

The test conditions for the QUV Accelerated Weathering Tester were set as follows: Wavelength: UV-B (313 nm, peak of the UV radiation at noon time in summer) with intensity of 1.5-1.75×; weathering cycle: 12 hours (UV step: 70° C. for 8 hours; condensation step: 45° C. for 4 hours). This cycle was repeated for 28 days. FIG. 6 shows samples before they were placed in the Accelerated Weathering Tester.

Antimicrobial Assay

An antifungal test for the silane treated stamp sand granules was carried out by soaking the silane-treated granules in cow's milk. Generally, the milk spoiled within 24 hours if the storing temperature was elevated to above room temperature, as bacteria and mold formed.

Procedure: Silane-coated stamp sand granules (10.0 g) were placed into a ϕ60 mm petri dish. Milk (4.0 mL; Jilbert Fat-Free Skim Milk) was pipetted onto the granules, and the dish was gently shaken to let the milk uniformly dispersed in the mass of granules. The Petri dish was covered, sealed, and place into an incubator at 28° C. The incubated result was checked every 24 hours until 20 days.

Results and Discussion

Saturation of Untreated Stamp Sand Granules

Figure 7:
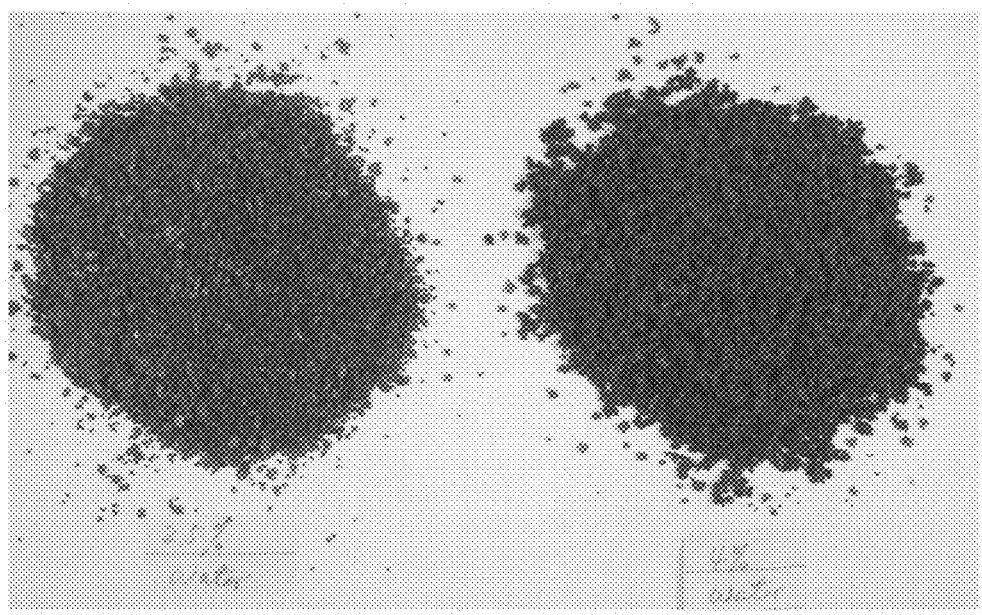
FIG. 7 shows G-sand with 2.5 wt. % water (left) and 4 wt. % water (right).

FIG. 7 shows the effect of moisture content on the untreated G-sand and demonstrates that untreated sand is very hydrophilic, willingly accepting small amounts of moisture onto the particle surfaces. Referring to FIG. 7, the G-sand granules on the left were low moisture (2.5 wt. % water); the G-sand granules on the right were high moisture (4 wt. % water).

Surface Hydrophobicity of G-Sand Granules

Figure 8:
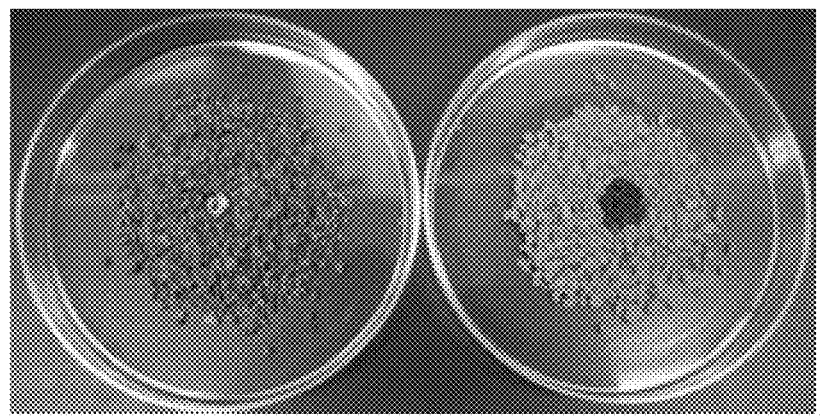
FIG. 8 shows the results of a Volcano Test of G-sand that is silane treated (left) and untreated (right).

FIG. 8 shows the results of a Volcano Test of G-sand that is silane treated (left) and untreated (right). Referring to FIG. 8, in the silane-treated sample, a dropped water bead maintained its spherical shape, demonstrating the hydrophobic-nature of the surface of the granules, whereas in the untreated sample, water was immediately spread and absorbed by the surface of granules, demonstrating the hydrophilicity of the untreated G-sand.

Figure 9:
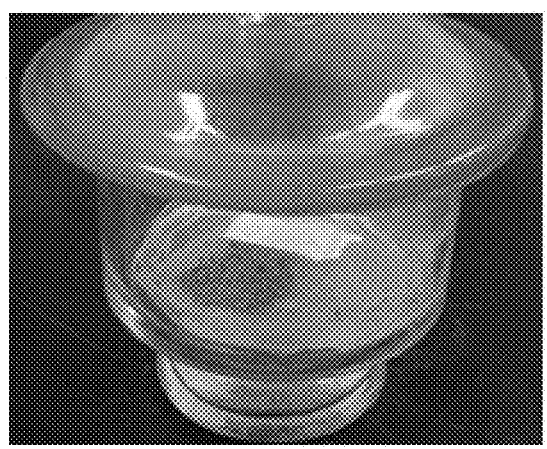
FIG. 9 shows an experimental set-up for a hydrophobicity test of G-sand under humid conditions.

Under a low humidity experimental condition, the water droplet was maintained on the top of treated G-sand for at least 3 hours before it had evaporated. However, under humid conditions, the water droplet was retained for 241 hours. FIG. 9 shows an experimental set-up for a hydrophobicity test of G-sand under humid conditions.

Adhesion of Silane Treated Stamp Sand Granules to Asphalt

Figure 10:
FIG. 10 shows G-sand granules embedded in asphalt substrate.

Treated and untreated G-sand samples were separately embedded on the surface of asphalt substrate, as shown in FIG. 10, and then soaked in water for 3 weeks. The adhesion strength was tested by the removal of embedded granules from asphalt substrate with a tweezer and the aid of microscope.

Experimental results have shown that the treated granules were tightly adhered to the asphalt, while the untreated granules were easily removed.

Antifungal Activity

Figure 11:
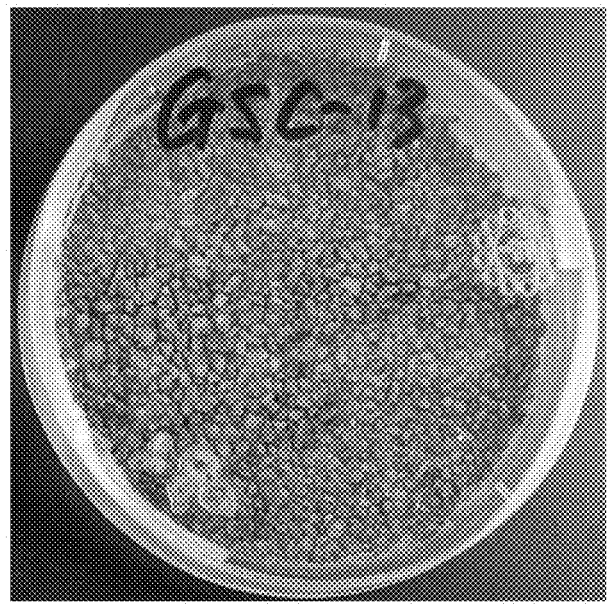
FIG. 11 shows a Petri dish containing G-sand immediately after saturation with milk (TOP) and after incubating for 14 days (BOTTOM).
Figure 11:
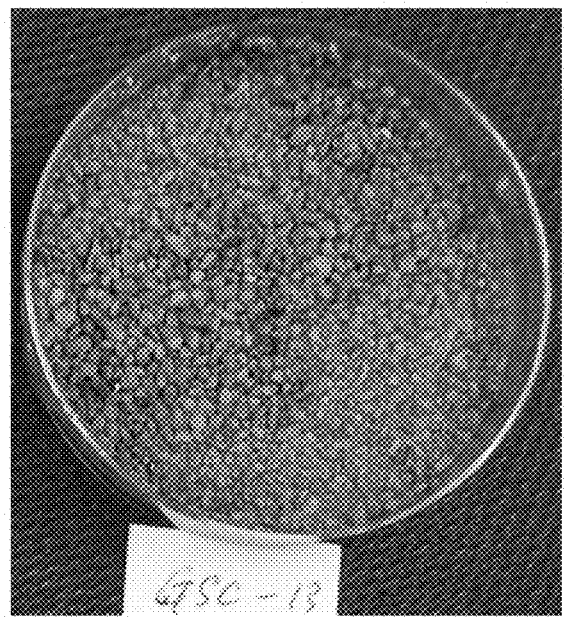

FIG. 11 shows a Petri dish containing G-sand immediately after saturation with milk (TOP) and after incubating for 14 days (BOTTOM). After incubation for 14 days, there was no visible mold growth on the surface of the granules. This result demonstrates that the silane-treated stamp sand granules have antifungal properties.

Factors Affected Hydrophobicity and Adhesion of Stamp Sand Granules to Asphalt Substrate (1) Consuming Rate of Silane for Treatment of G-Sand Granules Various concentrations of silane solution and alternative ratios of silane/stamp sand granules were used to determine the optimum addition of silane. The results showed that the surface of G-sand granules can be entirely covered using 2 ml of KBM-13 silane (Shin-Etsu Chemical Co., Ltd., Tokyo, Japan) to 1000 grams of stamp s1and (0.15 wt. %).

The procedure used was as follows: Prepared six 600 mL plastic beakers; placed 200 g dried stamp sand into each of the beakers; added 10 mL silane solution prepared into the granules of each beaker, and vigorously stirred the sands with a glass stick for 5 minutes. Transferred the mixture into a metal pan and dried at 110° C. for 2 hours. The concentration of silane in the solutions added was 1%, 2%, 3%, 4%, 4% 5% and 6%, respectively. The results are shown in Table 2.

TABLE 2

Relation of water repellence of silane-treated stamp sand granules to the concentration of silane soluiton used as determined by the "Volcano test"

| Sample No. | Stamp sand granules (g) | Silane solution added (mL) | Silane concentration (%) | Time water bead lasted |
|---|---|---|---|---|
| GSC-49 | 200 | 0 | 0 | 0 |
| GSC-50 | 200 | 10 | 1 | <2 hours |
| GSC-51 | 200 | 10 | 2 | 8 hours |
| GSC-52 | 200 | 10 | 3 | >14 days, evaporated |
| GSC-53 | 200 | 10 | 4 | >14 days, evaporated |
| GSC-54 | 200 | 10 | 5 | >14 days, evaporated |
| GSC-55 | 200 | 10 | 6 | >14 days, evaporated |

The results demonstrated that the water beads on stamp sand granules without silane coating are absorbed immediately by the granules. Once treated with silane solution, the average time the water droplets lasted increased with the increase in silane concentration. When the concentration of silane was increased to 3%, the time the water bead lasted was extended to greater than 14 days.

(2) Effect of the Process Temperature on Hydrophobicity and Adhesion of G-Sand Granules The effect of temperature on hydrophobicity and adhesion of treated granules were investigated as follows. Preheated samples of G-sand were used to produce silane-coated G-sand. After coating, the coated samples were also heated in order to understand effect of the temperature to adhesive strength. Results showed that both the preheated and after-heated samples have improved adhesion strength compared to that of air-dried samples.

All G-sand granular samples were treated with 6% KBM-13 silane solution (pH 4.5, added amount 5 wt. %). To determine the effect of process temperature on hydrophobicity and adhesion of treated G-sand granules, the untreated stamp sand was preheated before silane treatment, or heated immediately after silane treatment, at various temperatures and times. The data are summarized in Table 3. The untreated sample was used as a control for comparison.

TABLE 3

Effect of Temperature on Hydrophobicity and Adhesion of G-Sand

| | Preheat | | Silane Solution | | Drying | | Adhesion | |
|---|---|---|---|---|---|---|---|---|
| Sample # | Preheat (° C.) | Preheat time (h) | silane concentration (%) | Added (G-sand basis, %) | Method (° C.) | Time (h) | Soaked days | Adhesive area (%) |
| GSC-23 | — | — | 6 | 5 | air-dry | 12 | 10 | 96.83 |
| GSC-24 | 105 | 2 | 6 | 5 | air-dry | 12 | 10 | 92.33 |
| GSC-25 | — | — | 6 | 5 | 105 | 0.5 | 10 | 94.17 |
| GSC-26 | — | — | 6 | 5 | 105 | 1 | 10 | 93.17 |
| GSC-27 | — | — | 6 | 5 | 105 | 2 | 10 | 94.67 |
| GSC-28* | untreated | — | | | | | 10 | 74.5 |
| GSC-29** | wet sand | — | 6 | 5 | 105 | 2 | 10 | 95.67 |
| GSC-30 | 75 | 2 | 6 | 5 | air-dry | 8 | 10 | 98.17 |
| GSC-31 | 50 | 2 | 6 | 5 | air-dry | 8 | 10 | 98.33 |
| GSC-32 | — | — | 6 | 5 | 50 | 1 | 10 | 96.5 |
| GSC-33 | — | — | 6 | 5 | 50 | 2 | 10 | 97.5 |
| GSC-34 | — | — | 6 | 5 | 75 | 2 | 10 | 93.67 |

TABLE 3-continued

Effect of Temperature on Hydrophobicity and Adhesion of G-Sand

| | Preheat | | Silane Solution | | Drying | | Adhesion | |
|---|---|---|---|---|---|---|---|---|
| Sample # | Preheat (° C.) | Preheat time (h) | silane concentration (%) | Added (G-sand basis, %) | Method (° C.) | Time (h) | Soaked days | Adhesive area (%) |
| GSC-35 | — | — | 6 | 5 | 75 | 1 | 10 | 94.17 |
| GSC-36 | — | — | 6 | 5 | 75 | 0.5 | 10 | 95.67 |

*Untreated G-Sand
**Wet G-Sand

The results showed the silane-treated G-Sand granules exhibited higher adhesion than that of the untreated G-Sand granules. There was no significant difference for adhesion among the samples preheated at 100° C., 75° C., 50° C., un-preheated, after-heat at 105° C., 75° C., 50° C., and air-dry with various periods of time. The "Volcano test" showed that the lasting time of a water bead on GSC-23 was over 4.5 hours under normal atmospheric conditions. Thus, it has been demonstrated that the process temperature has no significant impact on adhesion of treated granules to asphalt.

In addition, the result from GSC-29 show that wet G-sand granules can also achieve high adhesion by silane-treating but without completely drying. This finding suggests that wet G-sand granules may be used to advantage during full-scale production treatment. It may also mean that the silane treatment can be very inexpensively applied to mineral aggregates prior to the production of asphaltic concrete for highway paving purposes.

Weathering Impact on the Water Repellency and Adhesion

Figure 12:
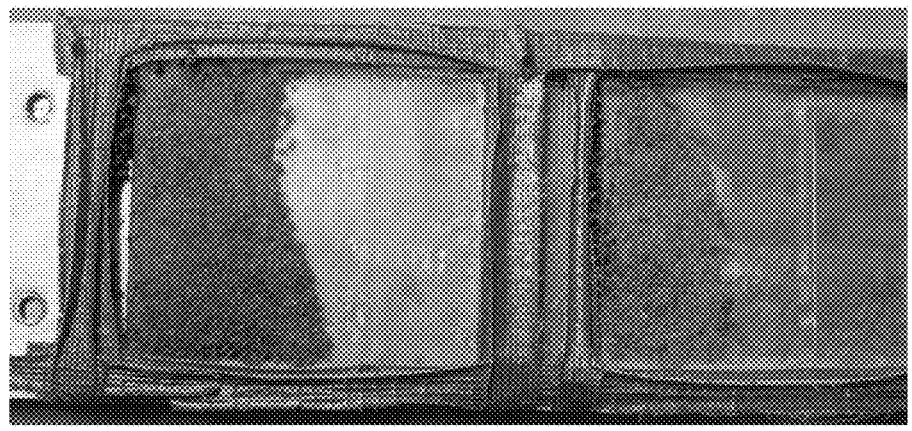
FIG. 12 shows G-sand granule samples after 28 days of a UV radiation test.
Figure 13:
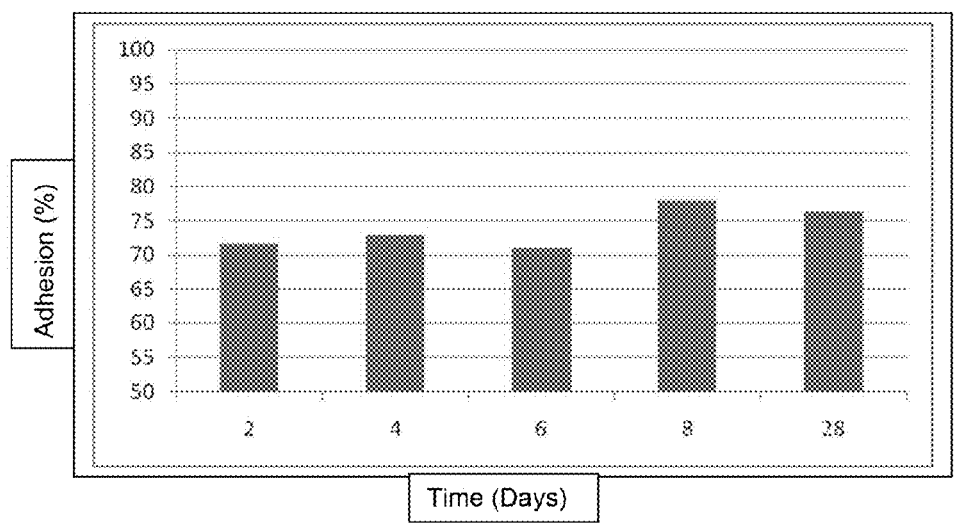
FIG. 13 shows silane-treated G-sand adhesion vs. number of days of exposure to UV radiation.

As shown in Table 4, the water repellency and adhesion of stamp sand granules to asphalt showed minimal change with the increase in exposure days to severe UV radiation. When the exposure time of the stamp sand to UV radiation increased from 2 days to 28 days, the lasting time of water droplets on the granules was still greater than 10 days, and the sticky area percentage (i.e., adhesion) remained between 71.0% and 78% (see FIG. 13), suggesting that the silane coating on the stamp sand granules is stable under sunlight radiation. FIG. 12 shows G-sand granule samples after 28 days of a UV radiation test.

TABLE 4

Weathering impact on the water repellency and adhesion

| Sample# | Exposure to UV (days) | Volcano test (lasting time) | Adhesion test (%) |
|---|---|---|---|
| GSC-55 | 2 | | 71.67 |
| | 4 | 11d, evaporated | 73.0 |
| | 6 | | 71.0 |
| | 8 | 14d, droplet remained | 78.0 |
| | 28 | 10d, evaporated | 76.33 |

Coloring Treatment of Stamp Sand Granules

This experiment was performed to develop a process to manufacture colored granules with stamp sand, combined with the silane treatment process. To provide alternative colorful surface for stamp sand granules, pigment treatment has been carried out. In this study, several colors have been used on the surface of silane treated granules, and either dried at low or high temperature.

Materials and Processing

Two processes have been used to obtain the colored surface on stamp sand granules.

(1) Prepare Color Coatings of Stamp Sand Granules with Silane

Figure 14:
FIG. 14 shows silane-treated stamp sand granules that have been treated with color pigments.

Several inexpensive color pigments have been used for the color treatment of silane-treated stamp sand granules, which include magnetite powder (black), chrome oxide (green), titanium dioxide (white), and iron oxide (red), as shown in FIG. 14.

Procedure: 200 g stamp sand granules (ISP specification of grains, dried at 110° C. for 2 hours), added 10 ml 4% silane solution previously prepared, mixed for 5 min. with vigorous stirring. This was to assure all the surface of granules had been fully saturated with silane solution. Added desired color pigment into the wetted stamp sand, and continuously stirred for 3 min. in order to the pigment were uniformly dispersed on the surfaces of the granules. Dried the samples at 110° C. for 2 hours.

(2) Prepare Color Coatings of Stamp Sand Granules as a Ceramic Coating

The following coating composition in grams was applied to 1,000 grams of dried stamp sand granules:
Water 20.0
Sodium Silicate 40.0 (50% 1.6° sodium silicate)
Titanium Dioxide 20.0
Bentonite Clay 120.0
Total: 200.0 grams Procedure: Sodium silicate was combined with water and stirred for 3 minutes to prepare sodium silicate solution. Pigment powder was prepared by mixing bentonite with titanium dioxide and vigorously blending. Stamp sand granules were placed into a stainless steel container, and the sodium silicate solution was poured onto the granules, which were vigorously stirred for about 2 minutes to let the sodium silicate solution fully saturate the granules. The pigment powder was added to the wetted granules, and the mixture was blended for 5 minutes to uniformly cover the wetted granules with pigment powder. The pigment-coated granules were dried in a furnace at 110° C. for 2 hours, then fired it at 600° C. for 2 hours. After cooling down to room temperature, 50 mL of a 4% KBM-13 solution was added to the ceramic-coated granules, which were stirred for 5 minutes. The silane-treated ceramic-coated granules were dried at 105° C. in a furnace to remove the moisture from the coated granules.

Water Repellency and Adhesion Test

The adhesion characteristics of the G-sand samples treated with both silane and white pigment were also investigated. The "volcano test" showed that a water droplet was retained on the divot for over 3 hours in a dry air laboratory until the droplet evaporated. The adhesion of colored G- and granules to asphalt (by "plucking" method, 73-81% in area) was lower than those samples without color.

The accelerated weathering test was also employed for these colored granules. As shown in Table 5, after using the weathering process described as above, the lasting time of hydrophobicity as shown by the "volcano test" was maintained over 13 days, and the adhesion test showed a stable adhesion with increasing exposure time from 2 days to 8 days.

TABLE 5

Volcano test and adhesion test results of white colored granules

| Sample# | Exposure to UV (days) | Volcano test (lasting time) | Adhesion test (%) |
|---|---|---|---|
| GSC-38 | 2 | | 58.33 |
| | 4 | 13d, evaporated | 58.0 |
| | 6 | | 47.67 |
| | 8 | >13d, droplet remained | 59.0 |

Example 9

Natural Antifungal Effects of Stamp Sand Against Mold

Test 1 Granules Samples
Test Samples

The test samples were taken from stamp sand piles at Gay, Mich. The test samples used in this assay are Gay #3 and Gay #12. Gay #3 represents the stamp sand on the surface of the pile (in oxide environment), while Gay #12 was taken down 15 feet from the surface of the pile and represents the buried samples (non-oxide state).

There were two sizes of particles, 30-40 mesh and -40 mesh, used to test for each sample. The former represents coarse particles; the later represents fine particles.

Two clay mineral samples (Wyoming white bentonite and Georgia kaolin) and two slag samples of copper smelter (porous and vitreous) were used as controls. Bentonite and kaolin were commercial products which have been broadly utilized in building materials and additives in plastics, wood products, paints, etc. The particle size of clay is about 2 microns. The porous and vitreous slags taken from previous smelter plant on Portage Lake possessed plenty of micro-pores and were dense and glass-like, respectively. The slag samples were ground down to 30 mesh size.

Procedure

About 1.0-1.5 g dried test sample were placed into a UV-disinfected round PVC case with a screed lid. The Jilbert Fat-Free Skim Milk was pipetted into the case until the test sample was saturated with the milk. The test sample was placed into an incubator at 36° C. to generate mold. Changes in the test sample were periodically monitored. After the 7th day of incubation, the liquid over the sample surface partly evaporated, and 1.0 mL of distilled water was pipetted into each case to maintain water saturation.

Results
Test 1. Granular Samples

Figure 15:
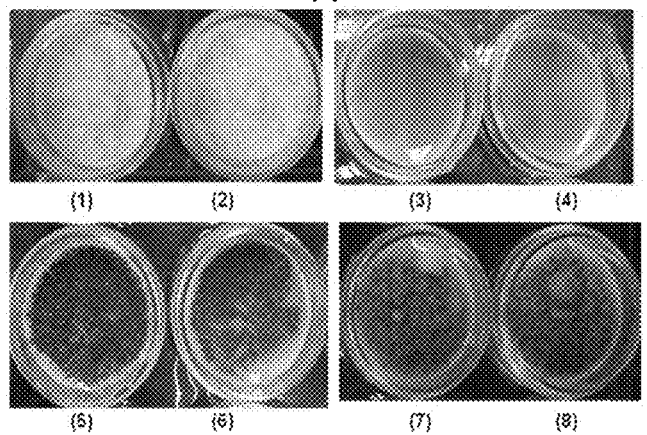
FIG. 15 shows the antifungal effect of stamp sand and copper slag after being incubated at 36° C. for A) 0 hours, B) 48 hours, and C) 21 days. The samples were as follows: (1) white bentonite; (2) kaolinite; (3) Gay #3 (−40 mesh); (4) Gay #12 (−40 mesh); (5) vitreous slag; (6) porous slag; (7) Gay #3 (30-40 mesh); (8) Gay #12 30-40 mesh).
Figure 15:
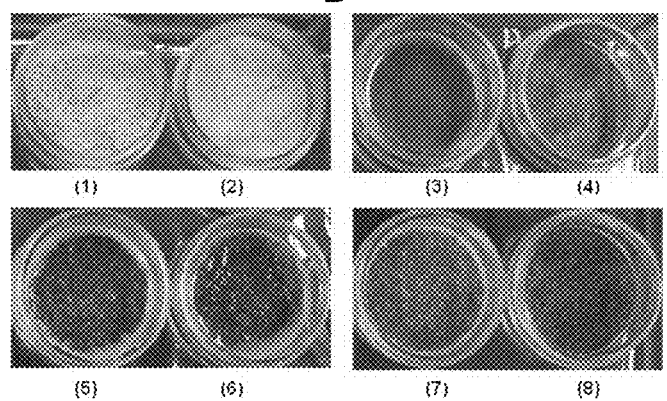
Figure 15:
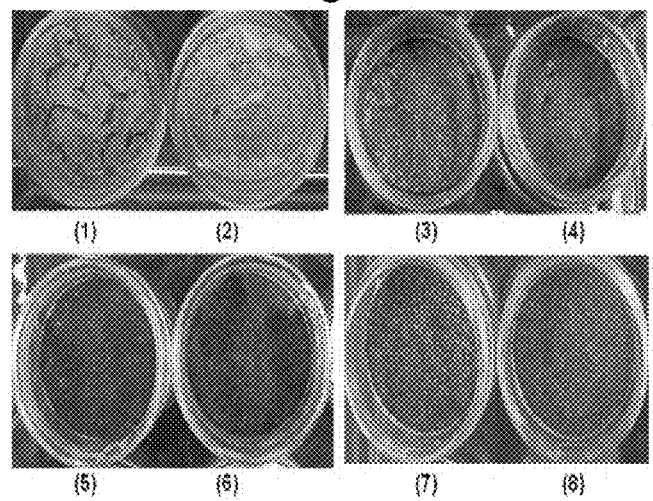

FIGS. 15a-c show the antifungal effect of stamp sand and copper slag after being incubated at 36° C. for 0 hour, 48 hours, and 21 days. Referring to FIGS. 15A-C, the samples were as follows: (1) white bentonite; (2) kaolinite; (3) Gay #3 (−40 mesh); (4) Gay #12 (−40 mesh); (5) vitreous slag; (6) porous slag; (7) Gay #3 (30-40 mesh); (8) Gay #12 30-40 mesh).

By 48 hours, bentonite and kaolinite had been completely covered by molds with color change, but no mold was present in the cases containing stamp sands and copper slag. After 7 days, the fine particles of Gay #12 started developing mold, but very slowly. The fine particles of Gay #3 followed after 12 days. After 21 days, the fine particles of Gay #3 and #12 were covered with thin films of mold. However, no mold appeared on the sample surfaces of coarse stamp sand and slag. These results demonstrate stamp sand granules have excellent antifungal characteristics.

Test 2. Powder Samples
　Test sample: Stamp sand powder, −325 mesh.
　Test fungus: *Aspergillus niger*
　Test method: pour-plate method
　Media: Nutrient-salt agar. Chemical composition and preparation:
　　$KH_2PO_4$ 0.7 g
　　$K_2HPO_4$ 0.7 g
　　$NH_4NO_3$ 1.0 g
　　$MgSO_4 \cdot 7H_2O$ 0.7 g
　　NaCl 0.005 g
　　$FeSO_4 \cdot 7H_2O$ 0.002 g
　　$ZnSO_4 \cdot 7H_2O$ 0.002 g
　　$MnSO_4 \cdot H_2O$ 0.002 g
　　Agar granule 15.0
　Stamp sand samples added: 10 mg, 25 mg, and 50 mg per plate (25 mL media, 3-4 mm in thickness). The test for each sample was duplicated.

Figure 16:
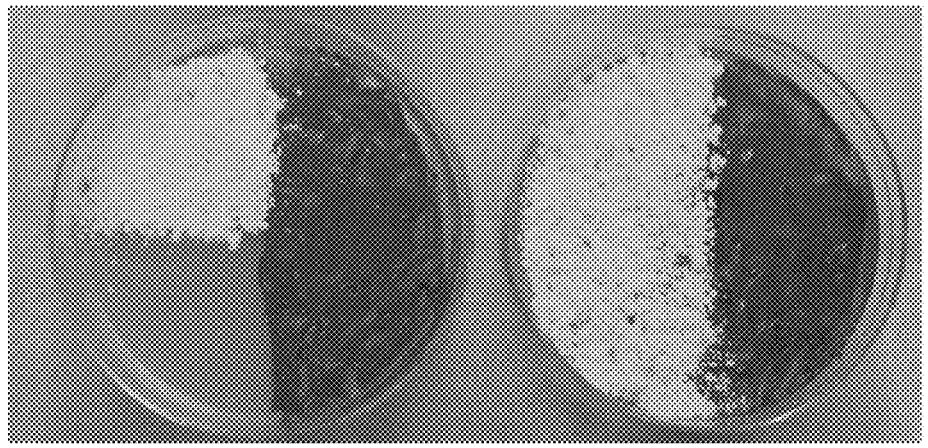
FIG. 16 shows test samples and agar plates at zero incubation time. Left plate treatments: upper-left: kaolin; lower-left: blank (agar plate); right: stamp sand. Right plate treatments: left: kaolin; right: stamp sand.

FIG. 16 shows the test samples and agar plates at zero incubation time. Left plate treatment: upper-left: kaolin; lower-left: blank (agar plate); right: stamp sand. Right plate treatment: left: kaolin; right: stamp sand.

Figure 17:
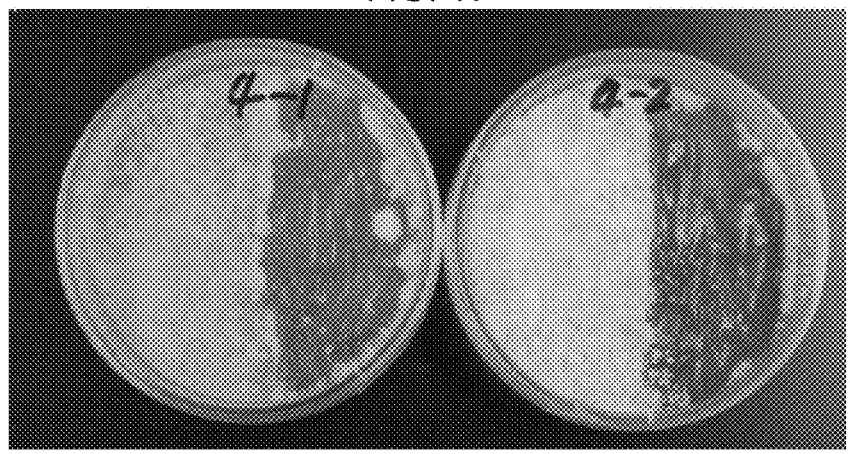
FIG. 17 shows test samples and agar plates after incubating at 28° C. for 4 days. Left plate treatments: upper-left: kaolin; lower-left: blank (agar plate); right: stamp sand. Right plate treatments: left: kaolin; right: stamp sand.

As shown in FIG. 17, after incubating at 28° C. for 4 days, all the surfaces of kaolin and uncovered agar plate were covered with white mold mycelia. However, no visible mycelia grew up on surface of stamp sand.

Figure 18:
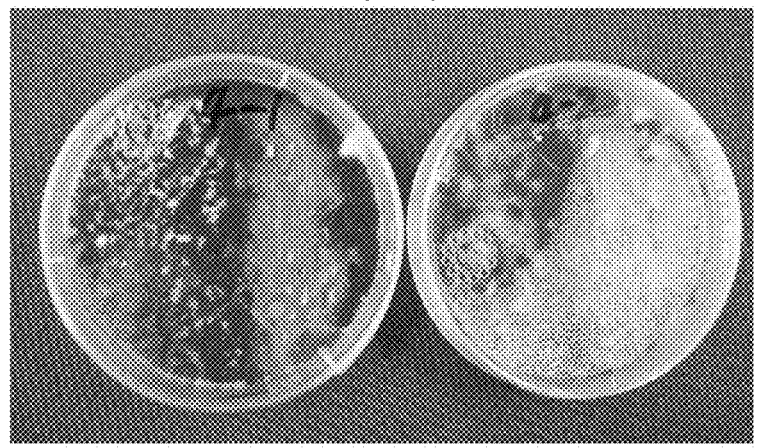
FIG. 18 shows test samples and agar plates after incubating at 28° C. for 6 days. Left plate treatments: upper-left: kaolin; lower-left: blank (agar plate); right: stamp sand. Right plate treatments: left: kaolin; right: stamp sand.

As shown in FIG. 18, after 6 days of incubation, the mold developed a black color. After incubation for 14 days, there were visible mold mycelia growing on the surface of stamp sand, except the edge of the sample area. The moisture in the plates was maintained continuously.

The experimental results demonstrated stamp sand has excellent antifungal activity against *Aspergillus niger*, the very common mold causing disease and damaging properties. It also shows that the coarser stamp sand has more resistance than does the very fine fraction used in the powder sample tests.

Example 10

Silane Treatment of Highway Aggregate

Figure 19:
FIG. 19 shows asphalt and limestone before embedding in asphalt.

Samples: Basalt (AB-0 to AB-4) and limestone (AL-0 to AL-4) aggregate, shown in FIG. 19.
Procedures
Procedure A Aggregate was dried at 105° C. overnight, then dipped in silane solution and dried at 105° C. for 2 hrs. The dried silane-treated aggregate was laid on asphalt, melted and embedded by heating the asphalt slide on an infrared hotplate until the asphalt melted and the aggregates embedded in the melted asphalt, cooled down, soaked in distilled water. The aggregates were gently torn apart from the asphalt and the area percentage of aggregate retaining with asphalt was determined.

Procedure B

Aggregate was boiled in water for 2 hrs, then place on paper toweling to absorb free water and put in air hood to dry. The aggregate surface was swabbed with silane solution. The aggregate was dried in air for 2 min., then laid on asphalt, melted and embedded by heating the asphalt slide on an infrared hotplate until the asphalt melted and the aggregates embedded in the melted asphalt, then cooled down, and soaked in distilled water. The aggregates were torn apart from the asphalt and the area percentage of aggregate retaining with asphalt was determined.

Procedure C

Aggregate was boiled in water for 2 hrs, then place on paper toweling to absorb free water. The aggregate surface was swabbed with silane solution. The aggregate was dried in air for 2 min., then laid on asphalt, melted and embedded by heating the asphalt slide on an infrared hotplate until the asphalt melted and the aggregates embedded in the melted asphalt, then cooled down, and soaked in distilled water. The aggregates asphalt was were torn apart from the asphalt and the area percentage of aggregate retaining with asphalt was determined.

Procedure D (Control Samples)

Aggregate was dried at 105° C. overnight. The dried silane-treated aggregate was laid on asphalt, melted and embedded by heating the asphalt slide on an infrared hotplate until the asphalt melted and the aggregates embedded in the melted asphalt, then cooled down, and soaked in distilled water. The aggregates asphalt was were torn apart from the asphalt and the area percentage of aggregate retaining with asphalt was determined.

Procedure E

Aggregate was boiled in water for 2 hrs, then place on paper toweling to absorb free water and put in air hood to dry. The aggregate surface was swabbed with silane solution. The aggregate was dried in air for 2 min., then melted asphalt was dropped on the aggregate surface. The aggregate/asphalt composition was then soaked in distilled water, torn apart, and the area percentage of aggregate with asphalt was determined.

Figure 20:
FIG. 20 shows asphalt and limestone embedded in asphalt.
Figure 21:
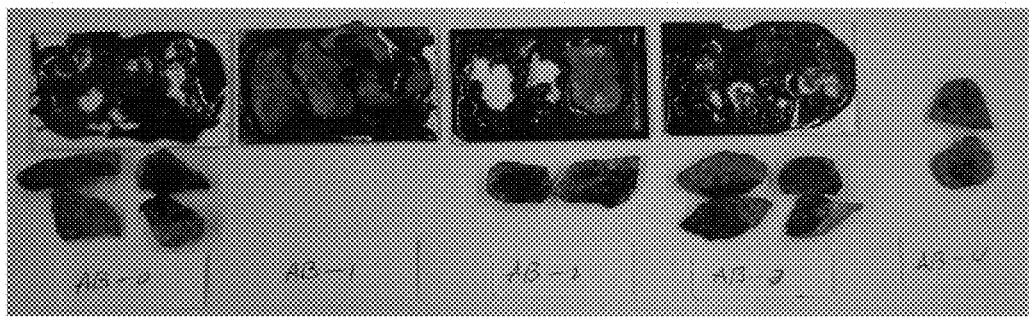
FIG. 21 shows A) basaltic and B) limestone aggregates pullout from asphalt substrates.
Figure 21:
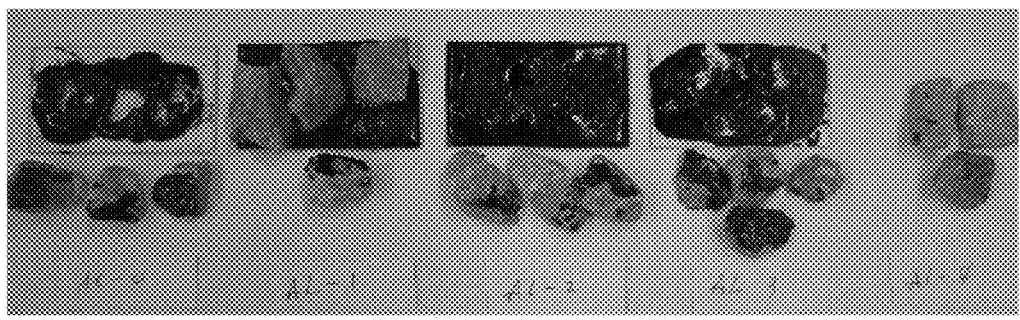

Silane solution used in Procedures A-E: KBM-13, 4%, pH=4-4.5 (prepared as described in Example 1). All samples were soaked in distilled water for 5 days. All the grains used have the same features (e.g., color, fracture surface, composition, density, etc.; basalt and limestone, respectively). As shown in FIG. 20, the flat surface of the aggregates was embedded into the asphalt. FIGS. 21A and B shows A) basaltic and B) limestone aggregates pull-out from asphalt substrates.

Samples were prepared using the procedures as summarized in Table 6. Table 7 summarizes the results of the adhesion tests.

TABLE 6

Samples Prepared and Procedure Used

| Sample # | Procedure used |
|---|---|
| AB-0, AL-0 | D |
| AB-1, AL-1 | A |
| AB-2, AL-2 | B |
| AB-3, AL-3 | C |
| AB-4, AL-4 | E |

TABLE 7

Adhesion Test Results

| Sample # | % area remained asphalt | Average area (%) | comment |
|---|---|---|---|
| AB-0 | 80, 50, 70, 50 | 61.7 | |
| AB-1 | None can be pulled apart | 100 | |
| AB-2 | 70, 80, one cannot be pulled apart | 83.3 | |
| AB-3 | 90, 90, 90, 90 | 90 | |
| AB-4 | 10, 15 | 12.5 | Not sticky |
| AL-0 | 60, 60, 80 | 66.7 | |
| AL-1 | 40, other 3 cannot be pulled apart | 85 | |
| AL-2 | 25, 15, 15 | 18.3 | |
| AL-3 | 10, 30, 50, 90 | 45 | |
| AL-4 | 2, 3, 4 | 3 | Not sticky |

Conclusions: With silane treatment, the adhesion improved, i.e., adhesion was better than that of the controls (totally dried but without silane). Silane treatment may be more effective on basalt than on limestone. The result is highly dependent on the absorbed moisture content of the aggregate when the aggregate has been silane-treated.

Example 11

Silane Treatment on Rocks Other than Basalt

Materials

Rocks and sand:
Sand: foundry silica sand
Crushed Gravels (aggregates): Granite, sandstone, dolomite, diorite, granodiorite, rhyolite
G-sand fines: −100 mesh
Coating: Silane KBM-13

Procedures

Preparation of silane solution: KBM-13 (12 mL) was dissolved in distilled water (200 mL) with stirring, pH value was adjusted to 4.0 with glacial acetic acid.

Coating

Coating of silica sand: To 1000 g silica sand was added 50 ml silane solution, the mixture was blended for 5 minutes.

Coating of gravels: gravels were placed into silane solution, soaked for 30 seconds, and then removed and drained until no further liquid dripped from the gravel surfaces.

The rocks were previously crushed by jaw crusher and roll crusher to pass ½ inch sieve size.

Coating of G-sand fines: To 180 g G-sand fines was added 40 ml silane solution, the mixture was blended for 5 minutes.

All samples were dried at 105° C. for 2 hrs

Water Repellence and Adhesion Tests

Water repellence test: applied volcano test method for sand and fines

Adhesion test: gravels were tested by the pullout method (plucking) from the asphalt substrate into which they were embedded. Procedure: treated and untreated (control) gravels were laid on an asphalt substrate. The asphalt was melted on a hotplate, and a flat surface of each piece of gravel was allowed to become embedded in the asphalt substrate. The asphalt substrate with embedded gravel was removed from the hotplate and allowed to cool down. The embedded samples were soaked in distilled water for 48 hours. Each piece of gravel was manually pulled from the asphalt substrate ("pull-out" method). The area percentage of each piece of gravel which retained a coating of asphalt after being torn from the asphalt substrate was determined.

Results

Figure 22:
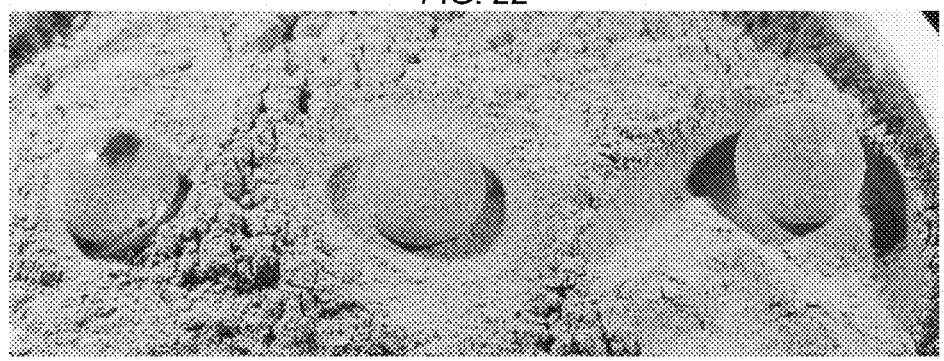
FIG. 22 shows water beads on silane-treated G-sand fines.
Figure 23:
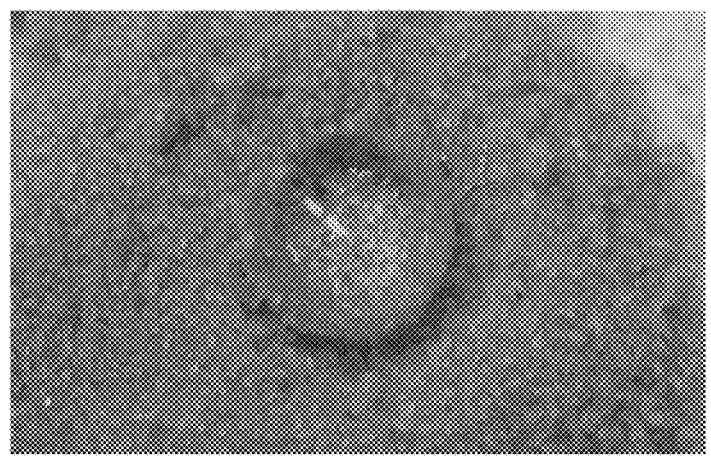
FIG. 23 shows a water bead on silane-treated silica sands.

Water repellence: water drops placed on G-sand fines became spheres covered with fine particles. As shown in FIG. 22, the contact angle with G-sand sample is greater than 150°. By using this volcano test described previously, all the retaining times of water beads on the sands and powder tested are greater than 3 hours. Beyond this time the water starts to disappear by evaporation. This is shown in FIG. 22 and FIG. 23 and summarized in Table 4.

TABLE 4

Results of Volcano Test

| Sample # | Rock type | Contact angle (°) | Water beads last (hr) |
| --- | --- | --- | --- |
| GSC-70 | Silica sand | not measured | >3.0 |
| GSC-71 | G-sand fines | >150 | >3.0 |
| GSC-77 | Granodiorite | 110-120 | >3.0 |

Direct measurement of capillary rise (or lack thereof) as reported for the fine basalt sand was not performed for the silica sand and granodiorite sand. However, the lack of wetting as observed visually and as computed using the measured contact angle indicates that none of these various treated fine sand-size materials will support capillarity, the rise of water in the soil above the phreatic surface. This is proven as follows by using the analogy of a bundle of capillary tubes representing the continuous voids between the solid particles in a soil mass. The commonly-known equation (2) is:

$$H_c = T \cos \alpha / d\rho w g \quad (2)$$

where $H_c$ is the height of capillary rise, T is the surface tension of the fluid, $\alpha$ is the measured contact angle between the fluid and soil, d is the equivalent internal diameter of a glass tube, $\rho w$ is the fluid density, and g is the gravitational acceleration Note that when the fluid wets the tube or soil, the contact angle $\alpha$ approaches zero and $\cos \alpha$ approaches unity. When $\alpha$ is greater than 900 as shown in Table 4, $\cos \alpha$ is a negative number, and there is no capillary rise of water in the tube or soil.

Figure 24:
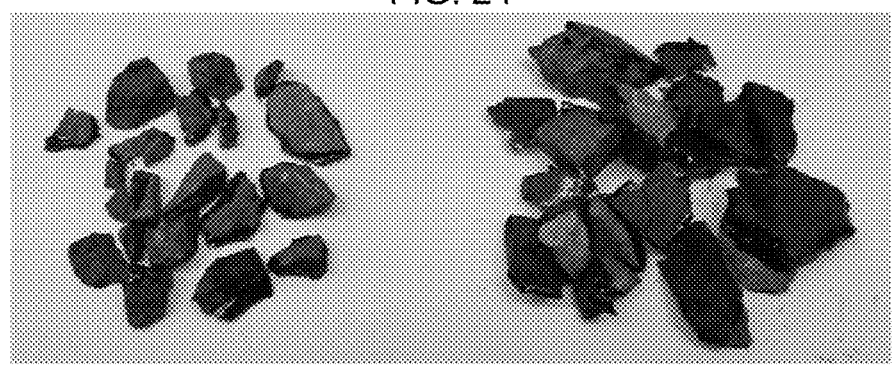
FIG. 24 shows granite gravels pulled out from asphalt substrate left-untreated; right-treated.
Figure 25:
FIG. 25 shows rhyolite gravels pulled out from asphalt substrate; left-untreated; right-treated.

By the pull-out method described above, it is clear that the treated gravels had significantly improved adhesion between the crushed gravels and asphalt matrices compared to the untreated control ones. The results are shown in Table 5, FIG. 24, and FIG. 25. Granite and rhyolite have the best performance among the gravel rocks, while dolomite is less impacted by the silane treatment than are the others. However, even for the dolomite there was improvement as the adhesive area of asphalt on dolomite was increased from 50.9% to 70.7% with silane treatment.

TABLE 5

Results of Adhesion Testing

| Sample # | Rock type | Average % area retained with asphalt (%) | Comment |
| --- | --- | --- | --- |
| GSC-73 | Granite | 96.3 | Very hard to pull out |
| GSC-73 control | Granite | 40.8 | |
| GSC-74 | Sandstone | 93.3 | Very hard to pull out |
| GSC-74 control | Sandstone | 34.0 | |
| GSC-75 | Dolomite | 70.7 | |
| GSC-75 control | Dolomite | 50.9 | |
| GSC-76 | Diorite | 92.3 | Very hard to pull out |
| GSC-76 control | Diorite | 68.3 | |
| GSC-78 | Rhyolite | 98.6 | Very hard to pull out |
| GSC-78 control | Rhyolite | 0.02 | Not sticky at all, easy to pull away |

What is claimed is:

1. A composition comprising:
   stamp sand granules embedded in asphalt, wherein the stamp sand granules comprise a silane coating, wherein the silane coating comprises methyltrimethoxysilane.

2. The composition of claim 1, wherein the stamp sand comprises a silica, a kaolinite, a talc, a limestone, a slate, a basalt, a nephelite, a bentonite, or a combination thereof.

3. The composition of claim 1, wherein the stamp sand granules comprise about 9% 8-12 mesh granules, about 38% 12-16 mesh granules, about 30% 16-20 mesh granules, and about 15% 20-30 mesh granules.

4. The composition of claim 1, wherein the stamp sand granules further comprise a pigment.

5. The composition of claim 4, wherein the pigment comprises titanium oxide, kaolin, bentonite, red iron oxide, chrome oxide, chrome green, carbon black, metal ferrite, and mixtures thereof.

6. The composition of claim 1, wherein the asphalt comprises a modified asphalt.

7. The composition of claim 1, wherein the composition comprises an average adhesion, and the average adhesion is at least about 60% after the composition has soaked in water for about 3 days to about 10 days.

8. The composition of claim 1, further comprising a paper, a fiberglass, or a combination thereof.

9. A method of making a silane-coated stamp sand, the method comprising:
   combining stamp sand granules and a silane solution to form a mixture; and
   drying the mixture,
   wherein the silane solution comprises methyltrimethoxysilane.

10. The method of claim 9, wherein the silane solution comprises at least about 0.10 wt. % of the mixture.

11. The method of claim 9, wherein the stamp sand granules comprise a pigment.

12. The method of claim 11, wherein the pigment comprises titanium oxide, kaolin, bentonite, red iron oxide, chrome oxide, chrome green, carbon black, metal ferrite, and mixtures thereof.

13. The method of claim 9, wherein the stamp sand granules comprise a ceramic coating.

14. The method of claim 13, wherein the ceramic coating comprises sodium silicate, a metal oxide, and bentonite clay.

15. The method of claim 13, wherein the metal oxide comprises titanium oxide, red iron oxide, chrome oxide, metal ferrite, and mixtures thereof.

16. The method of claim 9, wherein drying comprises heating the mixture from about 50° C. to about 110° C.

17. The method of claim 9, wherein the stamp sand granules are not dry.

18. A method of covering a surface, the method comprising:
- combining silane-coated particles and asphalt to provide a mixture; and
- distributing the mixture on the surface, wherein the silane-coated particles comprise methyltrimethoxysilane.

* * * * *